United States Patent Office 3,437,462
Patented Apr. 8, 1969

3,437,462
GELLED LIQUID HYDROCARBON FUELS CONTAINING CROSS-LINKED ATACTIC PROPYLENE POLYMERS
Richard P. Maloney, Chester, Pa., assignor to Sun Oil Company, Philadelphia, Pa., a corporation of New Jersey
No Drawing. Continuation-in-part of application Ser. No. 590,497, Oct. 31, 1966. This application Mar. 5, 1968, Ser. No. 710,634
Int. Cl. C10l 7/02
U.S. Cl. 44—7    10 Claims

ABSTRACT OF THE DISCLOSURE

This disclosure describes gelled normally liquid volatile hydrocarbon fuel compositions and processes for obtaining them. These compositions contain 1 to 40 weight percent cross-linked atactic propylene polymers which can be derived from atactic polypropylene, atactic random propylene-ethylene copolymer, or atactic terminal block propylene-ethylene copolymer. The propylene-ethylene copolymers can contain 1–30 weight percent copolymerized ethylene in the polymer chain. The gelled hydrocarbon compositions disclosed herein are particularly suited for use in military applications such as firebombs and flamethrowers.

Cross reference to related application

The present application is a continuation-in-part of my copending application Ser. No. 590,497, filed Oct. 31, 1966, now abandoned.

Brief summary of the invention

This invention relates to novel gelled fuel compositions having improved viscoelastic properties and improved tack properties and to methods of obtaining them. More particularly this invention relates to gelled fuel compositions containing cross-linked propylene polymers as gelling agents for volatile combustible hydrocarbon liquids. Specifically this invention relates to tacky viscous gelled fuel compositions particularly suitable as fuel in firebombs, flamethrowers, and related areas of military applications.

Background of the invention

Considerable art has been developed heretofore with respect to the manufacture of gelled or thickened fuels, particularly for use in firebombs, flamethrowers, and related military applications. Thickening agents such as natural or synthetic rubber, metallic fatty acid soaps, and various synthetic organic and inorganic polymers have been proposed as gelling agents for gasoline or similar normally liquid volatile hydrocarbon fuels. For example, U.S. Patents 2,445,311 and 2,606,107 propose polyisobutylene as a gelling agent. U.S. Patent 3,084,033 discloses that crystalline polypropylene is suitable for gelling liquid hydrocarbons although amorphous polypropylene is said to be unsuitable for that purpose. Recently it has been disclosed that napalm "B" which consists of 25 percent gasoline, 25 percent benzene, and 50 percent polystyrene, is presently being used as a fuel for firebombs and flamethrowers. While many of the prior art thickening agents have provided usable gelled fuel compositions, certain inherent deficiencies in each of these compositions render these compositions only fair at best.

Previous attempts to use atactic polypropylene as a gelling agent for volatile normally liquid hydrocarbons have been disclosed to be unsuccessful. It has, however, been recently discovered that atactic random propylene-ethylene copolymers and atactic terminal block propylene-ethylene copolymers are suitable for use as gelling agents for volatile normally liquid hydrocarbons. Compositions containing such copolymers are disclosed and claimed in my copending U.S. patent application Ser. No. 590,974, filed Oct. 31, 1966, now abandoned.

It has now been discovered that cross-linked atactic polypropylene and cross-linked propylene-ethylene copolymers provide improved gelled volatile liquid hydrocarbon fuel compositions particularly suited for military firebomb and flamethrower fuel applications. Whereas, the unmodified atactic polypropylene is said to be undesirable or unsuitable for gelling liquid hydrocarbon fuels (e.g., see U.S. Patent 3,084,033 noted above), the cross-linked atactic polypropylene has now been discovered to be particularly suitable for this purpose. And, whereas the atactic propylene-ethylene copolymers have been shown to be quite suitable for use as gelling agents for normally liquid volatile hydrocarbon fuels, the cross-linked atactic propylene-ethylene copolymers provide further improved gelled hydrocarbon fuel compositions which require less cross-linked polymer than when untreated polymer is employed.

It is a principal object of this invention to provide a novel process for thickening normally liquid volatile hydrocarbons, employing novel thickening agents, whereby thickened fuel compositions having improved properties are obtained. Another object of this invention is to provide a process utilizing novel thickening agents for making gelled volatile liquid hydrocarbon compositions which have the combined properties of being insensitive to moisture, and of having improved tack properties, and which require less thickening agent than other gelled fuel compositions heretofore disclosed. A more specific object of this invention is to provide new and improved gelled fuel compositions containing cross-linked atactic propylene polymer made from atactic polypropylene, cross-linked atactic random propylene-ethylene copolymers made from atactic propylene-ethylene copolymer or cross-linked atactic terminal block propylene-ethylene copolymers made from atactic terminal block propylene-ethylene copolymers as the thickening or gelling agents. These and other objects and benefits will become more readily apparent from a reading of the following detailed description of the invention.

Description of the invention

It has now been discovered that normally liquid hydrocarbons and mixtures thereof can be thickened to form a viscous tacky gelled fuel composition particularly suitable for firebomb and flamethrower fuel applications by admixture of the normally liquid hydrocarbons with a minor proportion (1–40 weight percent and preferably 5 to 25 weight percent) of cross-linked atactic polypropylene or cross-linked propylene-ethylene copolymers. It has been discovered that the cross-linked atactic polypropylene or propylene-ethylene copolymers inherently will absorb larger volumes of liquid hydrocarbons than the same polymers uncross-linked while maintaining gel characteristics. Thus a relatively small amount of cross-linked atactic polypropylene or atactic propylene-ethylene copolymer is needed to provide a suitable thickened normally-liquid hydrocarbon firebomb fuel composition. It has also been discovered that a gelled fuel composition prepared with cross-linked atactic polypropylene or propylene-ethylene copolymer has the further advantages of being highly tacky or sticky and also unaffected by moisture. These two particular advantages of gelled fuel compositions containing cross-linked atactic propylene polymer, made from atactic polypropylene or propylene-ethylene copolymer, along with the added characteristics of high stability and quick ignition over a broad temperature range, render these compositions particularly suitable and desirable for use in firebomb or flamethrower applications.

By the term atactic propylene polymers as disclosed herein is meant the substantially solid amorphous fraction of polymer recovered from the stereospecific polymerization of propylene or mixtures of propylene and ethylene wherein the major amount of polymerized monomer in the product is propylene. This polymer fraction is generally known in the art as the atactic fraction recovered as a by-product from the low pressure stereospecific polymerization process used in making crystalline polypropylene and propylene-ethylene copolymers. These stereospecific polymerization procedures are well known to those skilled in the art. Examples of this type of process are disclosed in Belgian Patent 538,782 and British Patent 994,416, as well as many others. Atactic propylene polymers are generally characterized as solid amorphous polymers having a molecular weight in the range of 1000–300,000, as measured by intrinsic viscosity in decalin at 275° F., and a density in the range of 0.82 to 0.91. The structure of the random copolymer is conceived to be of the general formula

—PPPEPPPPEEPPPPEPPPPP wherein P is a polymerized propylene monomer and E is a polymerized ethylene monomer. The typical atactic random propylene-ethylene copolymer can contain 1–20 weight percent polymerized ethylene and have an average molecular weight in the range of 20,000 to 150,000.

The structure of the terminal block propylene-ethylene copolymer is believed to be similar to the formula

—PPPPPPPPEEEPPPPEEEEEE

Again P represents a polymerized propylene monomer and E represents a polymerized ethylene monomer. The typical atactic terminal block propylene-ethylene copolymer can contain 5–30 weight percent polymerized ethylene in the propylene polymer molecule as measured by infrared analysis and have an average molecular weight in the range of 50,000 to 300,000. The atactic fraction of propylene-ethylene copolymers can also contain small quantities (<5%) of polyethylene as an impurity. These atactic propylene polymers can be cross-linked to provide a highly satisfactory and improved gelling agent for hydrocarbon fuel compositions.

In the process the polymers are prepared by polymerizing the constituent monomers in the desired proportions with the aid of certain polymerization catalysts, e.g., see above-mentioned Belgian patent. The catalysts are solid, insoluble, reaction products obtained by partially reducing a reducible, heavy, transition halide of a Group IV$b$ or VI$b$ or VIII metal with a reducing Group I and III metal-containing material such as an organometallic compound of an alkali, alkaline earth, rare earth metal or zinc. They can also be advantageously prepared by reducing an approprite metal compound with the aid of metallic aluminum or a mixture of aluminum, and titanium, etc. A catalyst of this type can thus be prepared, for example, by reducing 1 mole of titanium tetrahalide, usually tetrachloride, to the corresponding trivalent or subtrivalent titanium halide with about 0.2 to 6 moles of aluminum triethyl, triisobutyl, or other aluminum alkyl compound of the formula RR'AlX. In this formula, R, R' and X can comprise alkyl groups and which can alternatively be hydrogen or a halogen, notably chlorine. The reducing is carried out by dissolving each of the two catalyst components in an inert solvent, preferably a $C_3$ to $C_{18}$ paraffin such as isopentane or n-heptane, and mixing the two solutions in the proper proportions at temperatures between 0° and 300° F. and in the absence of moisture, oxygen, and sulfur impurities. The resulting precipitate in conjunction with some free aluminum alkyl compound is generally considered to constitute the actual active polymerization catalyst. Other organic and metallo-organic coordinators such as tetra ethoxy-silane or the dimethyl ethers of polyethylene glycol can also be added to form the coordinated complex catalysts usable for alpha-olefin polymerizations. Alternatively, it is possible to carry out the catalyst preparation using only about 0.3 to 0.8 mole of the aluminum alkyl compound per mole of titanium chloride, and then add a supplemental amount of the aluminum alkyl compound to the polymerization zone to raise the Al/Ti mole ratio therein to a value between about 1:1 and 3:1.

The monomers are then contacted with the resulting catalyst in the presence of inert hydrocarbon solvents. The hydrocarbon solvents that have been shown to be particularly useful for this purpose and particularly for propylene polymerizations include hexane and heptane.

The polymerization is conveniently effected at temperatures of about 100° to 250° F., and pressures ranging from about 0 to 500 p.s.i.g., usually 0 to 100 p.s.i.g. The catalyst concentration in the polymerization zone is preferably in the range of about 0.01 to 0.5 weight percent based on total liquid and the polymer product concentration in the polymerization zone is preferably kept between about 5 to 15 weight percent based on total contents so as to allow easy handling of the polymerized mixture. The proper polymer concentration can be obtained by having enough of the inert diluent present or by controlling the polymerization short of 100% conversion.

When the desired degree of polymerization has been reached, a $C_1$ to $C_3$ alkanol such as methyl alcohol, ethanol, or isopropyl alcohol is normally added to the reaction mixture for the purpose of deactivating and partially dissolving the catalyst. However, other methods of catalyst deactivation well known to those skilled in the art can alternately be used.

Typical alpha-olefin polymerization products obtained from the above-disclosed methods are normally mixtures of polymers with varying molecular structures and varying molecular weights which can be fractionated by solvents, the solvent-separated fractions being polymers of different structures and different molecular weights. In the polymerization process using an inert hydrocarbon polymerization medium such as pentane, hexane, or heptane, the product obtained will be generally in a slurry form and is normally partially soluble in the polymerization medium.

Generally, the insoluble polymer product is recovered from the solvent containing the dissolved polymer fractions by centrifuging the slurry or by filtration or both. The recovered solid polymer product is often subsequently washed with alcohol and dried to yield a white powdery high molecular weight, highly crystalline polymer product. This polymer fraction is normally referred to as the crystalline fraction.

The remaining solvent-soluble propylene polymer fractions often referred to as the atactic fraction are composed of primarily amorphous polypropylene or propylene copolymer which are defined as polymers of a non-stereoregular structure, which polymers are not crystallizable. Also, stereoblock polymer, which has been described as a generally linear alpha-olefin polymer having crystallizable segments of stereoregular structure and non-crystallizable segments of irregular structure in the same molecule, and crystalline polymers are present as impurities in atactic propylene polymers.

The atactic polymer can be recovered as a solid polymeric residue from the polymerization solvent by simple distillation or steam stripping. The dried polymer can then be cross-linked by blending the polymer with 0.5 to 10 weight percent of a cross-linking agent and masticating the mixture at a temperature in the range of 250° to 500° F. for a time period of from 0.1 to 10 hours. Cross-linking agents usable in the process of the present invention include certain organic peroxides. These organic peroxides are those known in the art that decompose and form free radicals, upon heating. Some of the free radical generating organic peroxides which can be used to cross-link the propylene polymers of the present invention include symmetrical or bis(aralkyl) and bis(alkyl) peroxides; dibenzyl peroxide, bis(α-methylbenzyl) peroxide, bis(α,α - dimethylnaphthylmethyl) peroxide, bis(α,α-dimethyl-p-methylbenzyl) peroxide, bis(α,α - dimethyl-p-isopropyl-benzyl) peroxide and di-t-butyl peroxide.

Unsymmetrical peroxides useful to cross-link the polymers of this invention include benzyl(α-methylbenzyl) peroxide, benzyl(α-methyl - p - methylbenzyl) peroxide, benzyl(α-methyl-p-isopropylbenzyl) peroxide, and t-butyl (α,α-dimethylbenzyl) peroxide. Other well known cross-linked catalysts include benzoyl peroxide, acetyl peroxide, lauroyl peroxide, t-butyl perbenzoate, cumene hydroperoxide, and dicumyl peroxide. Other free radical formers are the azo compounds such as α,α-azobis(isobutyronitrile).

The liquid hydrocarbons which can be thickened in accordance with the invention include pure hydrocarbons of any structural configuration, and mixtures of any and all such types, boiling within the range of from about 80° F. to about 650° F. at atmospheric pressure. Straight- or branched-chain paraffins and olefins, cycloparaffins and aromatic hydrocarbons can thus be thickened in accordance with this invention. Non-limiting examples of such hydrocarbons are: pentane, hexane, octane, decane, isopentane, isooctane, triptane, pentene-1, 2-methylbutene-1, hexene-1, heptene-1, octene-1, cyclopentane, cyclohexane, benzene, toluene, xylene, and the like. Various fractions of naturally-existing mixtures of hydrocarbons, such as certain fractions of petroleum, can also be satisfactorily thickened in accordance with the invention. Petroleum fractions boiling within the above-stated permissible atmospheric boiling range, including gasoline, kerosine, petroleum spirits, and No. 2 furnace oil, are particularly suitable for use in making a gelled volatile liquid hydrocarbon fuel concentrate. Gasoline fractions generally comprise mixtures of hydrocarbons boiling within the range of from about 80° F. to about 440° F., at atmospheric pressure. Petroleum spirits boil in the range of 300–400° F. and kerosine has an atmospheric boiling range of from about 350° F. to about 550° F. No. 2 furnace oil normally boils in the range of 400 to 650° F. at atmospheric pressure. Mixtures of such petroleum fractions in any and all proportions can also be suitably thickened in accordance with this invention. However, it is preferred that mixtures of petroleum fractions which comprise a No. 2 furnace oil fraction or other high boiling fractions should contain at least 80 weight percent gasoline to provide the volatility characteristics required in most applications for thickened hydrocarbon fuels.

As one means of illustration of the process and compositions of the present invention, the following examples are herein presented. As given hereinbelow all parts and percentages are by weight and all boiling point temperatures are at atmospheric pressure except where otherwise stated.

One procedure for cross-linking atactic propylene polymers comprises blending 1000 grams of the polymer with 40 grams of dicumyl peroxide and subsequently or concurrently heating the blend at 300° F. and masticating the heated mixture for 30 minutes. Each of the atactic propylene polymers disclosed in the examples given below were cross-linked by this procedure.

Example I 100 grams of cross-linked atactic polypropylene as described hereinabove were blended with 300 grams of a narrow cut petroleum fraction characterized as a mixture of hydrocarbons boiling in the range of 300–400° F. and generally comprised of 50 percent paraffins, 30 percent naphthenes and 20 percent aromatics. The blend heated and maintained at a temperature of 175° F. and stirred for two hours. A thick viscous liquid hydrocarbon gel concentrate resulted. The gelled concentrate was cooled to room temperature and further blended with 200 grams of gasoline. The finished blend comprised a highly viscous thickened hydrocarbon fuel composition readily ignitable and gel stable at any temperature in the range of −40 to +125° F. In view of the fact that atactic polypropylene that has not been cross-linked has been previously disclosed as being unsuitable or undesirable for use in forming gelled hydrocarbon fuel compositions, the present example demonstrates a substantial improvement in this art.

Example II 100 grams of cross-linked random propylene-ethylene copolymer as described hereinabove were used to gel 1000 grams of a volatile normally liquid hydrocarbon fuel identical to that disclosed in Example I. The procedure used in gelling the copolymer was identical to that used in Example I. The properties of this gelled volatile normally liquid hydrocarbon fuel composition were substantially equivalent to the properties of the composition of Example I. 250 grams of uncross-linked random propylene-ethylene copolymer were necessary to provide a gelled composition substantially equivalent in properties to the composition of this example.

Example III 100 grams of cross-linked terminal block propylene-ethylene copolymer of the type hereinabove described were blended with a hydrocarbon liquid as described in Example I in the identical manner as disclosed in Example II. A composition substantially equivalent to that of Example II was recovered. Approximately 200 grams of uncross-linked terminal block propylene-ethylene copolymer were necessary to provide a gelled liquid hydrocarbon fuel composition substantially equivalent to the composition of this example.

The above examples illustrate the fact that cross-linked atactic propylene polymers provide substantially improved gelled liquid hydrocarbon fuel compositions when compared with other similar compositions including the uncross-linked propylene polymers.

The invention claimed is:

1. A gelled normally liquid volatile hydrocarbon fuel composition comprising a major amount of a normally liquid volatile hydrocarbon fuel and a minor amount of cross-linked atactic propylene polymer.

2. A composition according to claim 1 wherein said polymer is cross-linked atactic polypropylene.

3. A composition according to claim 1 wherein said polymer is cross-linked atactic random propylene-ethylene copolymer.

4. A composition according to claim 3 wherein the copolymer contains 1 to 20 percent copolymerized ethylene.

5. A composition according to claim 1 wherein said polymer is cross-linked atactic terminal block propylene-ethylene copolymer.

6. A composition according to claim 5 wherein the copolymer contains 5 to 30 percent copolymerized ethylene.

7. A composition according to claim 1 wherein the normally liquid hydrocarbon comprises a mixture of liquid hydrocarbons which boil in the range of 80–650° F.

8. A composition according to claim 1 wherein the normally liquid hydrocarbon is gasoline.

9. A composition according to claim 1 wherein the cross-linked atactic propylene polymer comprises 1 to 40 percent by weight of the total composition.

10. A composition according to claim 1 wherein the cross-linked atactic propylene polymer comprises 5 to 25 weight percent of the total composition.

References Cited

UNITED STATES PATENTS 2,917,458 12/1959 Morway et al. _____ 252—59 X
3,084,033 4/1963 Kelly et al. _____ 44—7
3,336,121 8/1967 Jacobson et al. _____ 447—7

DANIEL E. WYMAN, *Primary Examiner.*

CARL F. DEES, *Assistant Examiner.*